United States Patent
Sambonsugi

(10) Patent No.: US 9,485,406 B2
(45) Date of Patent: Nov. 1, 2016

(54) FOCUS DETECTION APPARATUS, FOCUS DETECTION METHOD AND PROGRAM, AND IMAGING APPARATUS

(71) Applicant: CANON KABUSHIKI KAISHA, Tokyo (JP)

(72) Inventor: Hideaki Sambonsugi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/211,901

(22) Filed: Mar. 14, 2014

(65) Prior Publication Data
US 2014/0293115 A1    Oct. 2, 2014

(30) Foreign Application Priority Data
Mar. 26, 2013   (JP) ................. 2013-064240

(51) Int. Cl.
H04N 5/232   (2006.01)
G03B 13/36   (2006.01)

(52) U.S. Cl.
CPC ........... *H04N 5/23212* (2013.01); *G03B 13/36* (2013.01)

(58) Field of Classification Search
CPC .. H04N 5/23212; H04N 5/374; G03B 13/36; H01L 27/14627
See application file for complete search history.

(56) References Cited

U.S. PATENT DOCUMENTS 5,499,074 A * 3/1996 Ohsawa ................. G02B 7/346
396/111
6,819,360 B1 * 11/2004 Ide .................... H01L 27/14627
257/E27.131
8,711,270 B2 * 4/2014 Onuki ...................... G02B 7/34
348/345
2011/0025904 A1 * 2/2011 Onuki et al. .................. 348/360

FOREIGN PATENT DOCUMENTS

| JP | 2001-324665 A | 11/2001 |
| JP | 2007-325139 A | 12/2007 |
| JP | 2008-052285 A | 3/2008 |
| JP | 2010-091991 A | 4/2010 |

OTHER PUBLICATIONS

Japanese Office Action issued in corresponding application No. 2013-064240 on Jun. 16, 2015.

* cited by examiner

*Primary Examiner* — Ahmed A Berhan
(74) *Attorney, Agent, or Firm* — Carter, DeLuca, Farrell & Schmidt, LLP

(57) ABSTRACT

A focus detection apparatus is arranged to obtain image data of an object obtained by an imaging unit having a pupil division unit of a photographing optical system for forming an optical image of the object, obtain setting information of a focus detection mode of the photographing optical system, set a focus detection area set into a pixel array area of the imaging unit, by dividing a predetermined area into a plurality of division areas in accordance with the focus detection mode and arranging the plurality of division areas in accordance with a different positional relation, form focus detection information by using the image data of the set focus detection area, and generate a drive signal of the photographing optical system on the basis of the focus detection information.

15 Claims, 14 Drawing Sheets

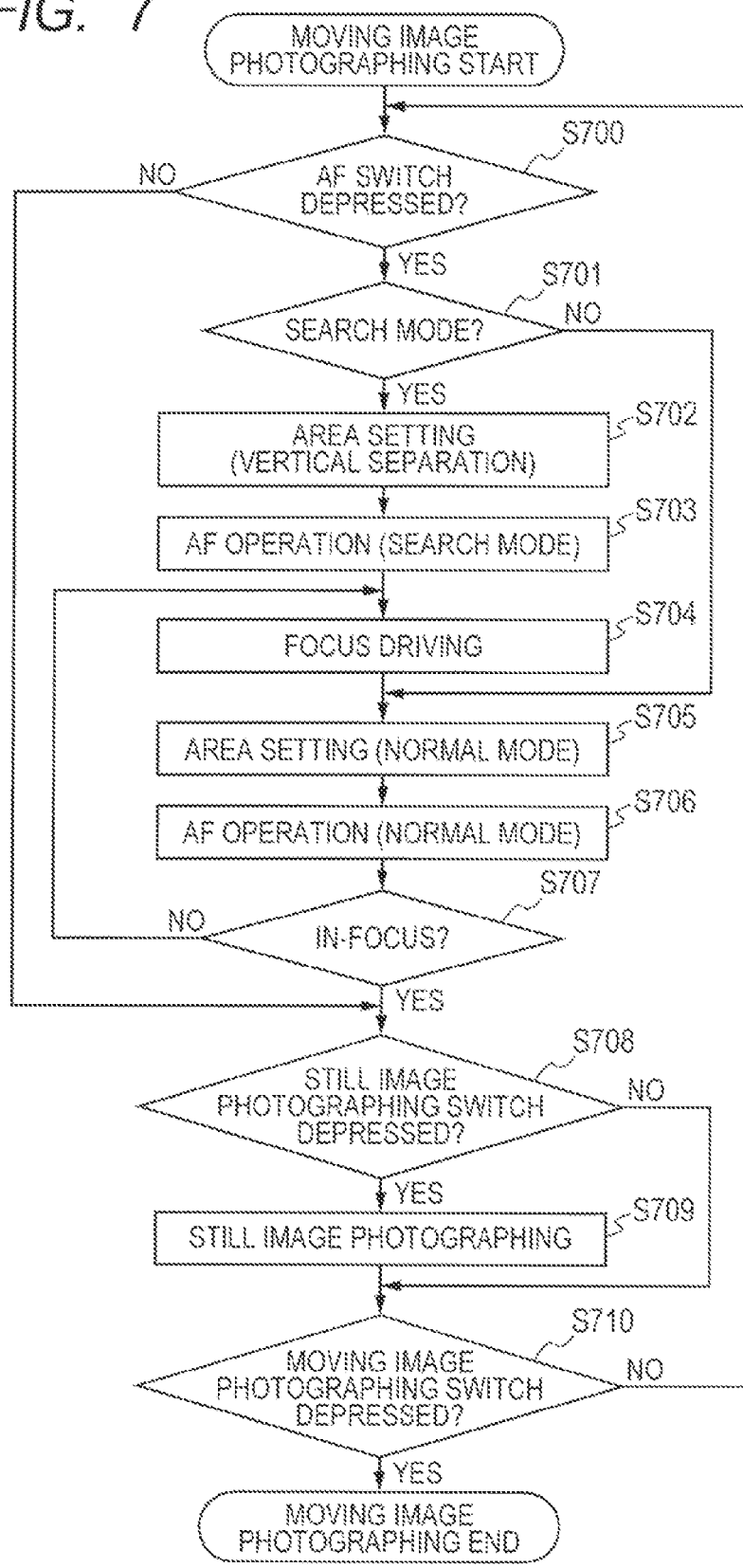

FOCUS DETECTION APPARATUS, FOCUS DETECTION METHOD AND PROGRAM, AND IMAGING APPARATUS

BACKGROUND OF THE INVENTION

1. Field of the Invention

The present invention relates to a focus detection apparatus for an autofocus function of an imaging apparatus and, more particularly, to a focus detection apparatus for performing a focus detection of a phase difference method by using an image signal from an imaging element having a pixel for a focus detection in an imaging plane and an imaging apparatus having such a focus detection apparatus.

2. Description of the Related Art

In the related arts, as a focus detection in an imaging apparatus, there is such a technique that a construction for receiving light which passes through different pupil planes of an imaging lens is used for a pixel of an imaging element, thereby performing a focus detection of a phase difference method simultaneously with an image pickup.

For example, in Japanese Patent Application Laid-Open No. 2010-091991, a focus detection is performed by using a plurality of image signals obtained by photoelectrically converting lights which pass through the different exit pupils, by an imaging element having a pixel constructed by one microlens and a plurality of photoelectric conversion units for dividing an exit pupil. At this time, a focus detection operation area is divided and correlation waveforms obtained from the image signals or the division areas are added, thereby adjusting a size of the focus detection area and performing the focus detection saleable for an object.

However, according to the technique disclosed in the foregoing Japanese Patent Application Laid-Open No. 2010-091991, in the case where it is intended to perform the focus detection covering a wider range of an image, it is necessary to increase the focus detection operation area itself. Thus, an amount or data to be processed increases and a scale of a circuit necessary for the arithmetic operation increases. In such a case, there is also such a problem that it takes a time until a final in-focus is obtained.

It is, therefore, an aspect of the invention to provide a focus detection apparatus and an imaging apparatus in which a focus detection covering a wide range is performed onto an image of one frame without increasing a focus detection operation area, and a time which is required to obtain an in-focus in a foots adjustment can be shortened.

SUMMARY OF THE INVENTION

To accomplish the above aspect, according to the invention, there provided a focus detection apparatus comprising: an image data obtaining unit configured to obtain image data of an object obtained by an imaging unit having a pupil division unit of a photographing optical system for forming an optical image of the object; a mode information obtaining unit configured to obtain setting information of a focus detection mode of the photographing optical system; a setting unit configured to set a focus detection area which is set into a pixel array area of the imaging unit, by dividing a predetermined area into a plurality of division areas in accordance with the focus detection mode and arranging the plurality of division areas in accordance with a different positional relation; a forming unit configured to form focus detection information by using the image data of the set focus detection area; and a drive signal generation unit configured to generate a drive signal of the photographing optical system on the basis of the focus detection information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification illustrate exemplary embodiments, features, and aspects of the invention and, together with the description, serve to explain the principles of rue invention.

FIG. 7 is a diagram illustrating a flowchart for the operation of the imaging apparatus according to the first embodiment of the invention.

DESCRIPTION OF THE EMBODIMENTS

Various exemplary embodiments, features, and aspects of the present invention will be described in detail below with reference to the drawings.

First Embodiment

Figure 1:
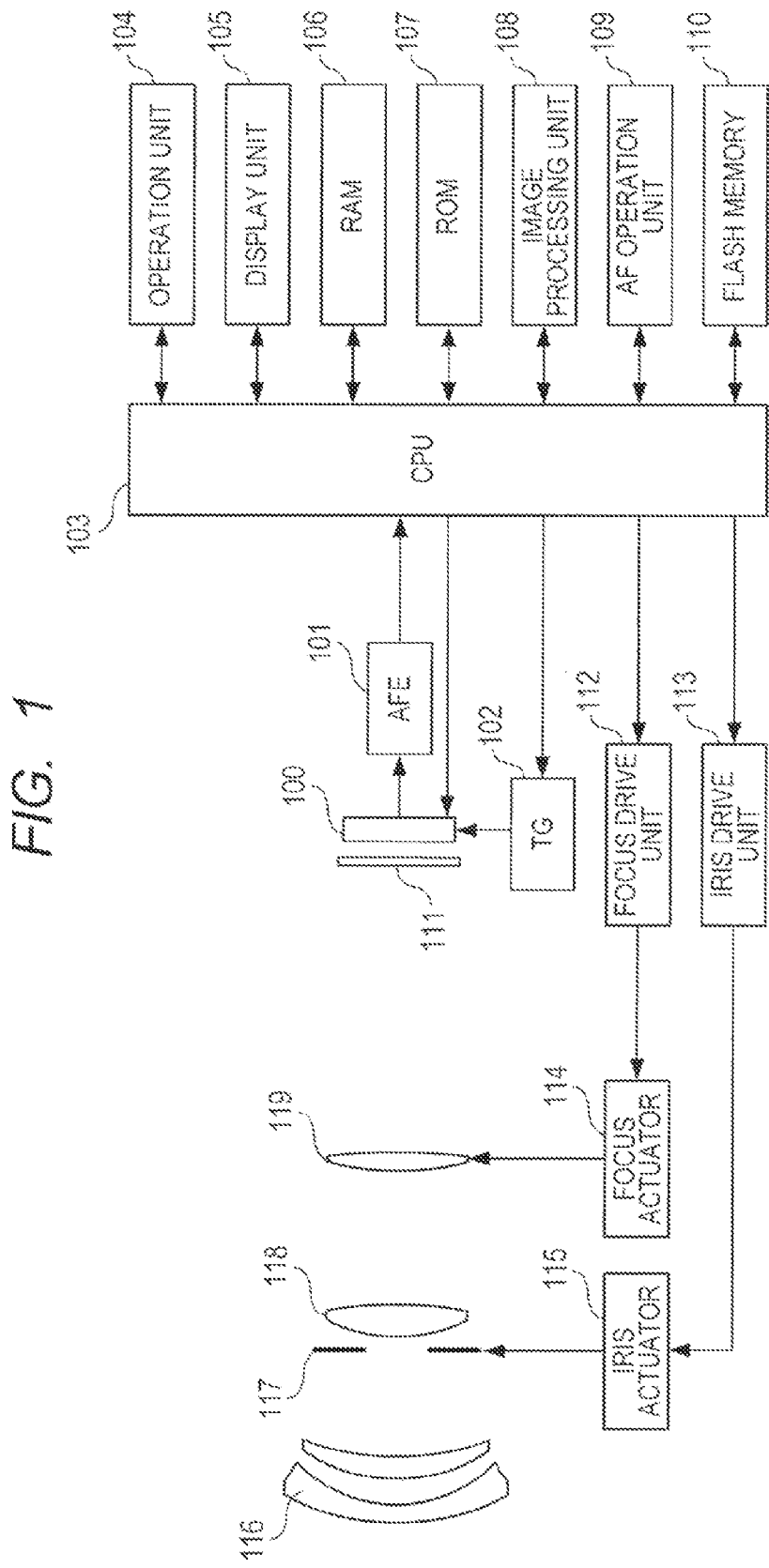
FIG. 1 is a diagram illustrating a construction of an imaging apparatus to which a focus detection apparatus according to the first embodiment of the invention is applied.

FIG. 1 is a block diagram illustrating a construction of an imaging apparatus to which a focus detection apparatus according to the first embodiment of the invention is applied.

In the diagram, an imaging element 100 photoelectrically converts an optical image of an object formed by a photographing optical system into an electric signal. The imaging element 100 is controlled by a CPU 103, which will be described hereinafter, or the like and photographs a still image or a moving image. An analog front-end 101 (hereinbelow, referred to as an AFE) for converting an analog image signal which is output from the imaging element 100 into a digital signal in correspondence to a gain adjustment and predetermined quantization bits. A timing generator (hereinbelow, referred to as a TG) 102 controls driving timing for the imaging element 100 and the AFE 101. Although the AFE 101 and the TG 102 are arranged in the outside of the imaging element 100 in the present embodiment, they may be built in the imaging element.

A RAM 106 has: a function of an image data storing unit for storing digital image data converted by the AFE 101 and image data processed by an image processing unit 108, which will be described hereinafter; and a function of a work memory which is used when the CPU 103, which will be described hereinafter, operates. Although those functions are executed by using the RAM 106 in the embodiment, another memory can be also used so long as it is a memory of such a type that an access speed is sufficiently high and there is no problem in the operation. A program which is loaded and executed by the CPU 103 in order to control the operation of each unit is stored in a ROM 107. Although a flash-ROM is shown as an example of the ROM 107 in the embodiment, another memory can be also used so long as it is a memory of such a type that an access speed is sufficiently high and there is no problem in the operation.

The CPU 103 is a control unit for integratedly controlling the imaging apparatus. As mentioned above, the CPU 103 executes the program for controlling each unit of the imaging element. The image processing unit 108 executes a processing such as correction, compression, and the like of the photographed still image or moving image. The image processing unit 108 also has an adding function of A-image data and B-image data, which will be described hereinafter, and a generating function of the still image and the moving image.

An AF operation unit 109 arithmetically operates the pixel signal which is output from the imaging element 100 in order to perform the focus detection. A detachable flash memory 110 is provided to record the still image data and moving image data. Although the flash memory is used as a recording medium in the present embodiment, another memory such as nonvolatile memory, hard disk, or the like in which data can be written may be used. Those recording media may be built in the apparatus. An operation unit 104 sets a photographing command, photographing conditions, and the like into the CPU 103. A display unit 105 displays the photographed still image and moving image, a menu, and the like.

A first lens group 116 is arranged at a front edge of the photographing optical system (common optical system) and is held movably backward and forward in an optical axis direction. An iris 117 adjusts a light amount at the time of photographing by adjusting its aperture diameter. A second lens group 118 is provided. The iris 117 and the second lens group 118 more integratedly backward and forward in the optical axis direction and realize a magnification function (zoom function) by an interlocking relational manner with the backward and forward operation of the first lens group 116. A third lens group 119 adjusts a focal point of the photographing optical system by the backward and forward moving in the optical axis direction.

A focal plane shutter 111 adjusts an exposure time when a still image is photographed. Although the exposure time of the imaging element 100 is adjusted by the focal plane shutter in the present embodiment, the invention is not limited to such a construction but may use a construction in which the imaging element 100 has an electronic shutter function and the exposure time is adjusted by a control pulse. A focus drive unit 112 as a focus position change unit for changing a focus position of the optical system drives a focus actuator 114 on the basis of a focus detection result of the AF operation unit 109 and drives the third lens group 119 so as to move backward and forward in the optical axis direction, thereby performing the focus adjustment. An iris drive unit 113 drives an iris actuator 115, thereby controlling an aperture of the iris 117. The AF operation unit 109, focus drive unit 112, and CPU 103 construct the focus detection apparatus according to the present embodiment.

Figure 2A:
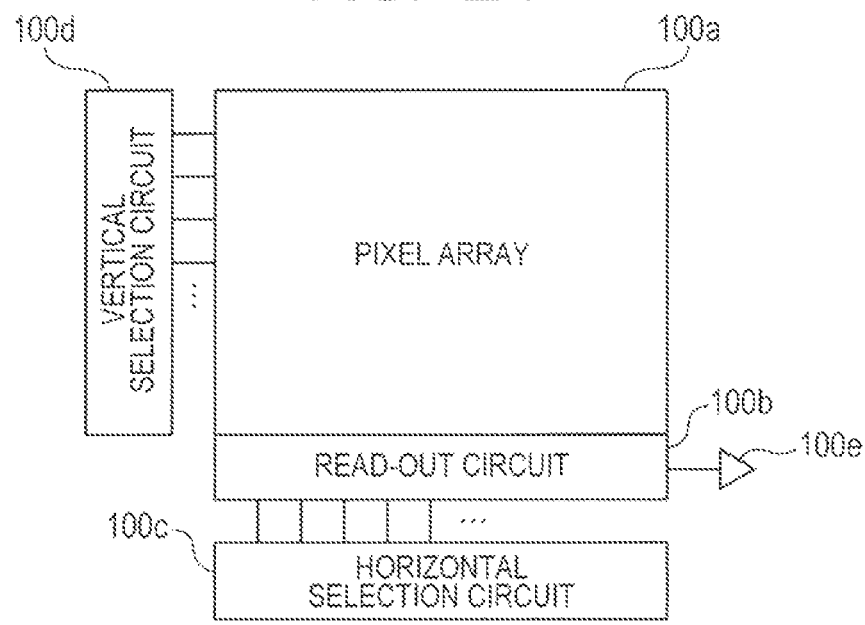
FIGS. 2A and 2B are diagrams illustrating a construction of an imaging element which is used in the imaging apparatus according to the first embodiment of the invention.

Subsequently, the construction of the imaging element 100 will be described with reference to FIGS. 2A and 2B. FIG. 2A illustrates the construction of the imaging element 100. In FIG. 2A, the imaging element has: a pixel array 100a in which pixels are two-dimensionally arranged; a vertical selection circuit 100d for selecting a row of the pixels of the pixel array 100a; and a horizontal selection circuit 100c for selecting a column of the pixels or the pixel array 100a. The imaging element 100 further has a read-out circuit 100b for reading out signals of the pixels selected by the vertical selection circuit 100d and the horizontal selection circuit 100c among the pixels of the pixel array 100a. The vertical selection circuit 100d selects the row of the pixel array 100a and validates, in the selected row, a read-out pulse which is output from the TG 102 and is based on a horizontal sync signal which is output from the CPU 103. The read-out circuit 100b has an amplifier and a memory provided every column and stores the pixel signals of the selected row into the memory through the amplifier. The pixel signals of one row stored In the memory are sequentially selected in the column direction by the horizontal selection circuit 100c and are output to the outside through an amplifier 100e. By repeating such an operation the number of times as many as the number of rows, the signals of all pixels are output to the outside.

Figure 2B:
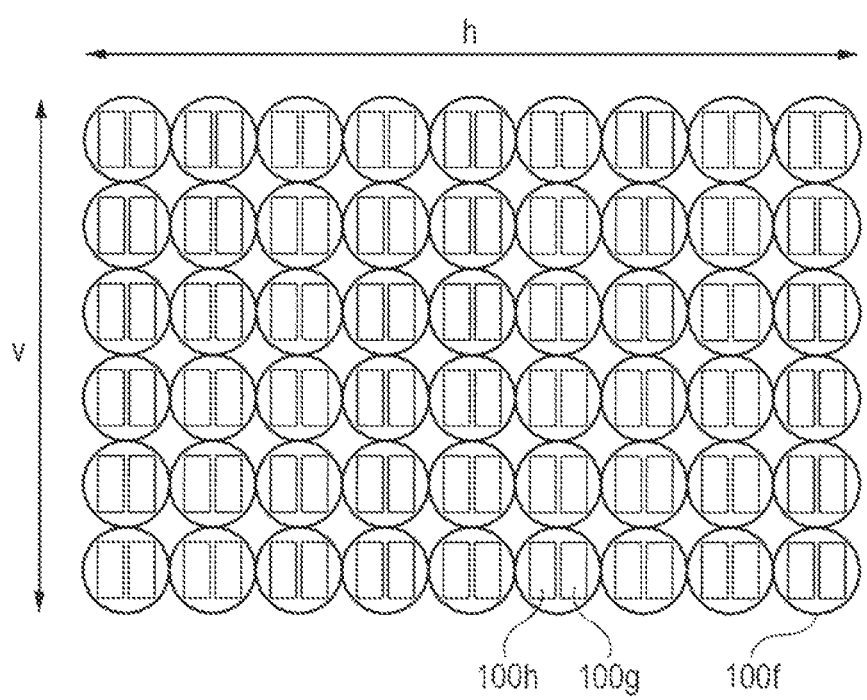

The pixel array 100a of the imaging element 100 is illustrated in FIG. 2B. In FIG. 2B, a microlens array is constructed by microlenses 100f. Photodiodes (PDs) 100g and 100h serving as photoelectric conversion units for performing a photoelectric conversion construct a photoelectric conversion unit for an A-image (hereinbelow, referred to as an A-image photoelectric conversion unit) and a photoelectric conversion unit for a B-image (hereinbelow, referred to as a B-image photoelectric conversion unit), which will be described hereinafter. Each pixel is constructed in such a manner that one microlens 100f is arranged over two PDs. That is, a focus-detection pixel has a plurality of photoelectric conversion units for one microlens. Assuming that an imaging area which uses the microlens 100f in common is one pixel, as such a pixel, h pixels are arranged in the horizontal direction and v pixels are arranged in the vertical direction in the pixel array area. The signals accumulated in the PD 100g and PD 100h are individually output to the outside by the foregoing reading operation. Since different images having a phase difference therebetween enter the PD 100g and PD 100h by a pupil-division construction, which will be described hereinafter, it is assumed here that the PD 100g is the A-image photoelectric conversion unit and the PD 100h is the B-image photoelectric conversion unit. Although two PDs are arranged for one microlens in the present embodiment, the invention is not limited to such a construction. The invention can be also applied to a construction in which a plurality of PDs are arranged for one microlens in the vertical direction or lateral direction.

Subsequently, image data which are formed from the pixel signals which are output from the A-image photoelectric conversion unit and the B-image photoelectric conversion unit of the imaging element 100 will be described with reference to FIGS. 3A and 3B. In the diagrams, the same portions as those in FIGS. 2A and 2B are designated by the same reference numerals.

Figure 3A:
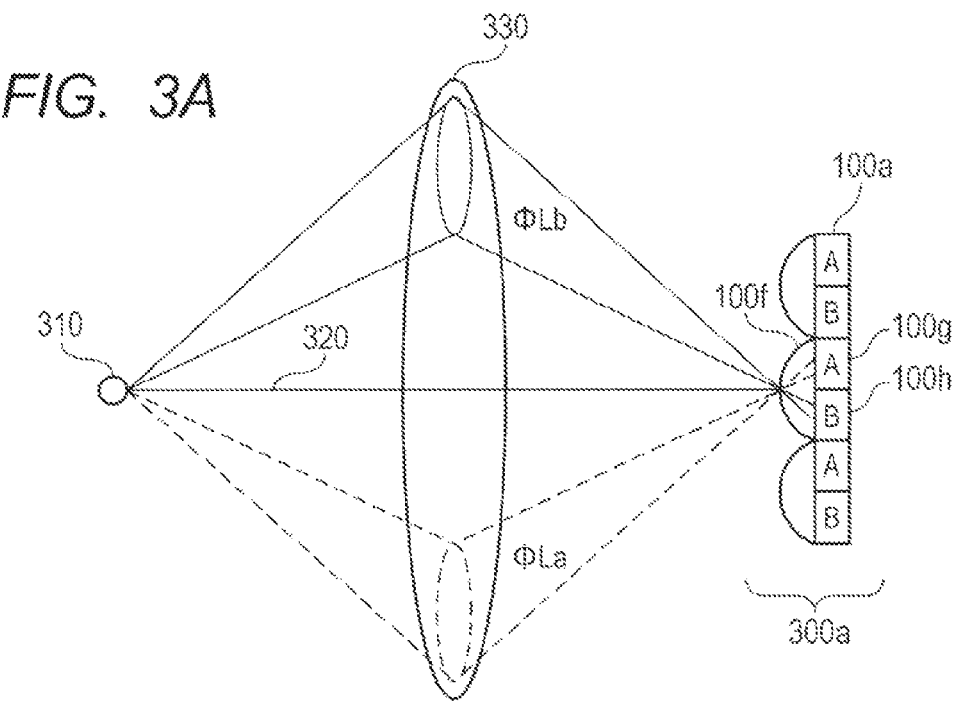
FIGS. 3A and 3B are diagrams illustrating a concept of a focus detection of a phase difference method.
Figure 3B:
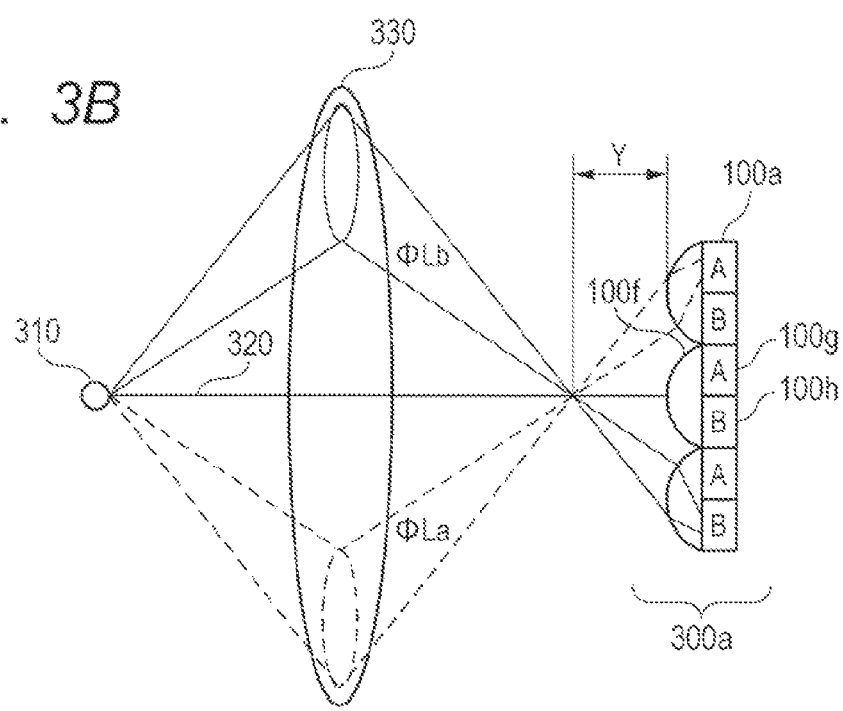

FIGS. 3A and 3B illustrate a relation between a focusing state in the imaging element 100 and the phase difference. In the diagrams, a cross section 300a of the pixel array 100a is illustrated. The foregoing microlens 100f, the A-image photoelectric conversion unit 100g, and the B-image photoelectric conversion unit 100h are illustrated. A photographing lens 330 is a lens obtained on the assumption that the first lens group 116, second lens group 118, and third lens group 119 illustrated in FIG. 1 are considered as one lens. Light emitted from an object 310 passes through each area of the photographing lens 330 while centering around an optical axis 320 as a center and is focused onto the imaging element. It is now assumed that the exit pupil and the center or the center of gravity of the photographing lens coincide. According to such a construction, when comparing the case where the photographing optical system is viewed from the A-image photoelectric conversion unit with the case where the photographing optical system is viewed from the B-image photoelectric conversion unit, they are substantially equivalent to a case where the pupil of the photographing optical system is divided symmetrically with respect to the center. In other words, the light from the photographing optical system is divided into two lights in what is called a pupil-division manner.

The divided light (the first light and the second light) enter the A-image photoelectric conversion suit 100g and the B-image photoelectric conversion unit 100h serving as the first photoelectric conversion unit and the second photoelectric conversion unit for receiving the pupil-divided light, respectively. The first light is the light which passes through a first area of the exit pupil and is pupil-divided. The second light is the light which passes through a second area deviated from the first area of the exit pupil and is pupil-divided. In this manner, the light from a specific point on the object 310 is divided into light φLa and light φLb. The former light is the light which passes through the derided pupil corresponding to the A-image photoelectric conversion unit 100g (A) and enters the A-image photoelectric conversion unit 100g (A). The letter light is the light which pusses through the divided pupil corresponding to the B-image photoelectric conversion unit 100h (B) and enters the B-image photoelectric conversion unit 100h (B).

Since those two light enter from the same one point on the object 310, in a focusing state of the photographing optical system, as illustrated in FIG. 3A, they pass through the same microlens and reach one point on the imaging element. Therefore, the image signals which are obtained from the A-image photoelectric conversion unit 100g and the B-image photoelectric conversion unit 100h coincide. However, as illustrated in FIG. 3B, in a de focusing state where a fecal point is deviated by Y, arrival positions of both of the light φLa and φLb are deviated from each other by a difference amount of an angle of incidence of each of the light φLa and φLb into the microlens. Therefore, a phase difference occurs between the image signals obtained from the A-image photoelectric conversion unit 100g and the B-image photoelectric conversion unit 100h. Two object images having the phase difference are photoelectrically converted by the A-image photoelectric conversion unit 100g and the B-image photoelectric conversion unit 100h and the converted electric signals (A-image signal and B-image signal) are separately output to the outside. Those signals are converted into digital signals by true AFE 101 and are used as A-image data and B-image data in the AF operation, which will be described hereinafter.

Although the construction in which one microlens is provided with a plurality of photoelectric conversion units and the pupil division is performed has been shown in the present embodiment, the invention is not limited to such a construction. The focus-detection pixel may be constructed in such a manner that one PD is provided under the microlens and the pupil division is performed by light-shielding the right and left portions or the upper and lower portions with light-shielding layers. The A-image signal and the B-image signal from focus-detection pixels arranged discretely may be obtained.

Figure 4:
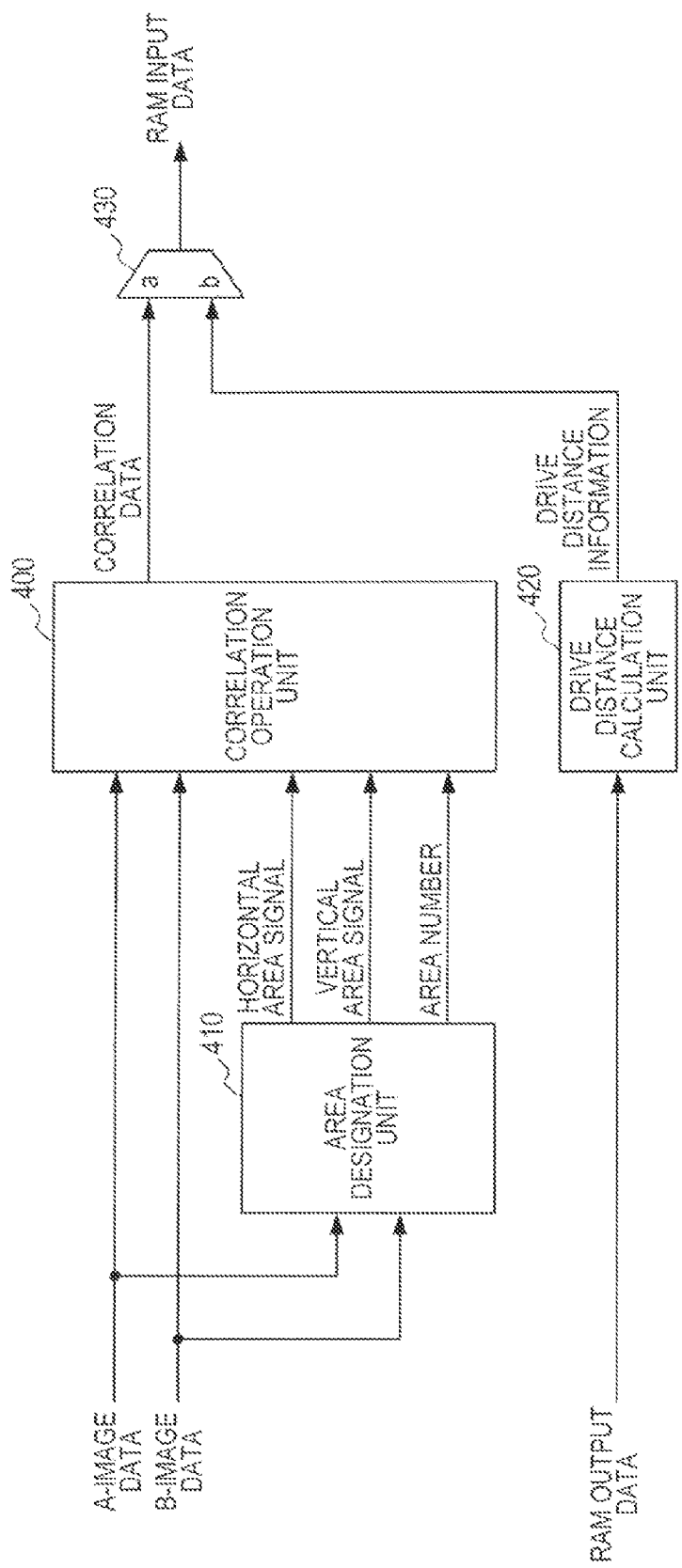
FIG. 4 is a diagram illustrating a construction of an AF operation unit of the focus detection apparatus according to the first embodiment of the invention.

Subsequently, a construction of the AF operation unit 109 constructing the focus detection apparatus of the embodiment will be described with reference to FIG. 4. FIG. 4 is a diagram illustrating the construction of the AF operation unit 109.

In the diagram, a correlation operation unit 400 calculates a correlation value of the A-image data and B-image data (first image data said second image data) which are input. An area designation unit 410 outputs a signal for designating an operation area to arithmetically operate a correlation value for the image data, to the correlation operation unit. A drive distance calculation unit 420 calculates a drive distance of the third lens group 119 on the basis of the correlation value calculated by the correlation operation unit 400. As data which is output to the RAM 106, a selector 430 selects either the data from the correlation operation unit 400 or the data from the drive distance calculation unit 420.

The operation of the AF operation unit 109 will now be described. When the A-image data and the B-image data are input to the AF operation unit 109, they are input to the area designation unit 410. As for the A-image data and the B-image data, the signals of the same pixel position are simultaneously input. In the area designation unit 410, the A-image data or B-image data which is input is counted and a horizontal or vertical position in the image of one frame constructed by the input image data is calculated. The focus detection area (hereinbelow, referred to as an AF area) is preset by the CPU 103. When the calculated horizontal position and vertical position lie within the set area, the area designation unit 410 makes a horizontal area signal and a vertical area signal active (High) to the correlation operation unit 400. In the correlation operation unit 400, a correlation arithmetic operation is performed to the A-image data and the B-image data at the time when the horizontal area signal and the vertical area signal are at the high level. By the setting which is made to the area designation unit 410 by the CPU 103, the AF area is divided info a plurality of division areas. On the bases of rises setting, to the correlation operation unit 400, the area designation unit 410 outputs an area number indicating to data in which division area the A-image data and the B-image data which are input correspond. In the correlation operation unit 400, the correlation arithmetic operation is performed for each division area with reference to the area number.

The imaging apparatus of the present embodiment has a normal mode and a search mode as a focus detection mode of the AF function (hereinbelow, referred to as an AF mode). In the normal mode, the AF area is divided into a predetermined number of areas. In the search mode, the AF area is divided info a predetermined number of areas and the division areas are separated in the vertical direction. By this construction, in the search mode, the focus detection can be performed to a wider range of the image of one frame without increasing the focus detection operation area than that in the normal mode.

In the correlation operation unit 400, a correlation value between the A-image data and the B-image data is calculated. A calculation construction or the correlation value will be described with reference to FIGS. 5A, 5B, 6A, and 6B.

Figure 5A:
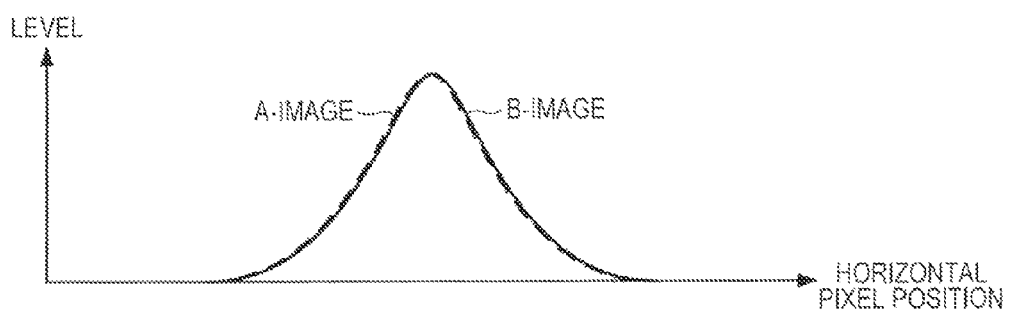
FIGS. 5A and 5B are diagrams illustrating a concept of the focus detection in the phase difference method.
Figure 5B:
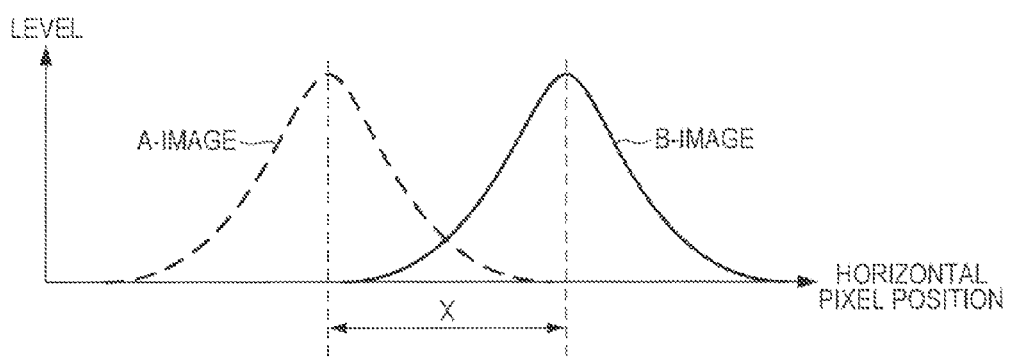
Figure 6A:
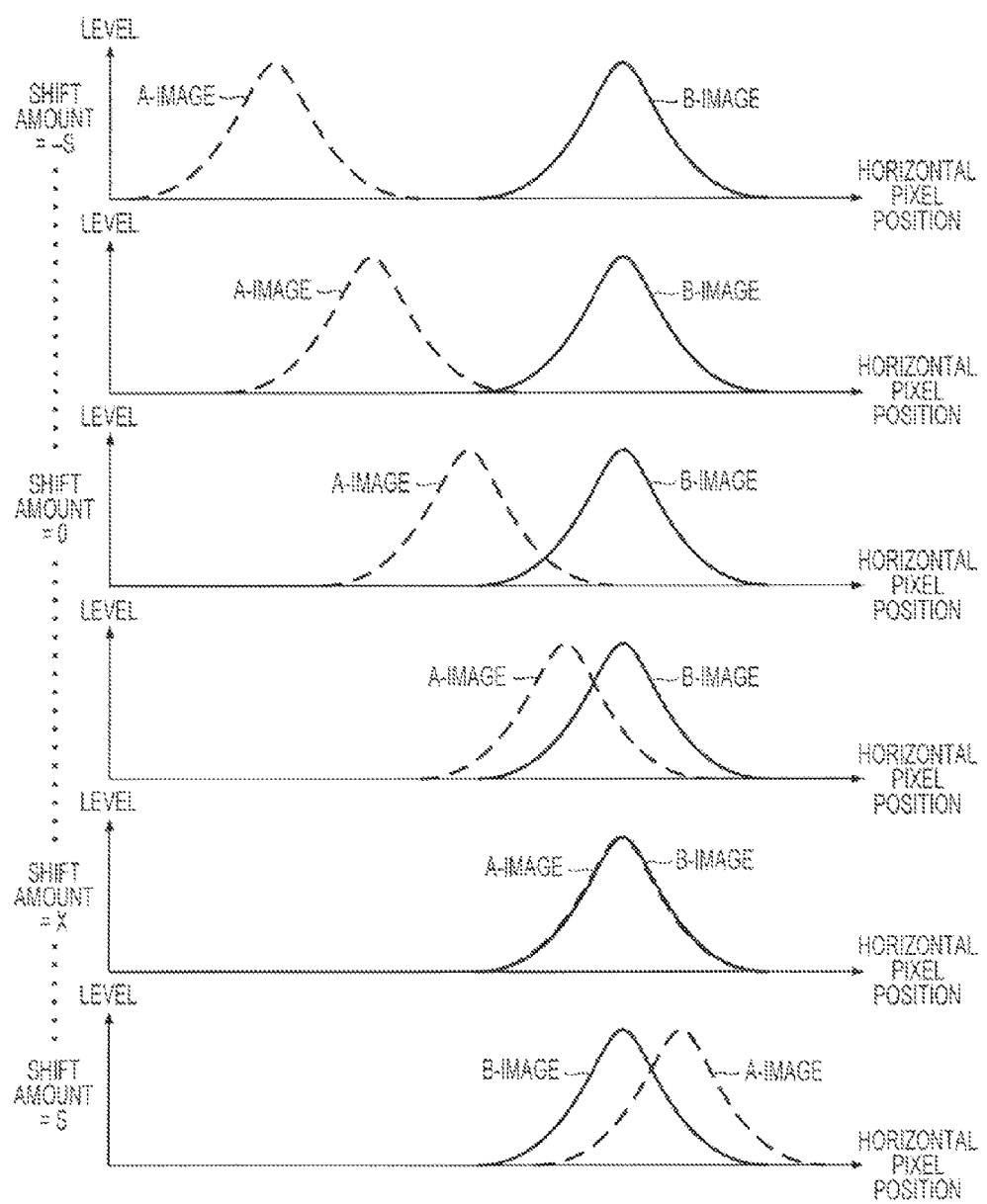
FIGS. 6A and 6B are diagrams for describing the operation of the AF operation unit of the focus detection apparatus according to the first embodiment of the invention.
Figure 6B:
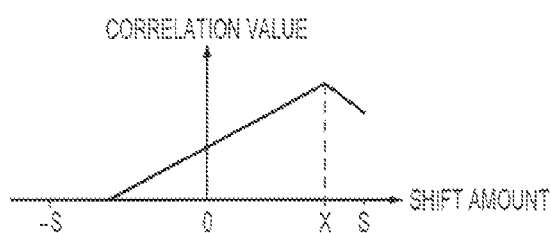

FIG. 5A shows the A-image data and the B-image data of one row in the case of the focusing state of FIG. 3A. An axis of abscissa indicates a horizontal pixel position and an axis of ordinate denotes a level of the data. In the case of the focusing state, the A-image data and the B-image data coincide. FIG. 5B shows the A-image data and the B-image data of one row in the case of the defocusing state of FIG. 3B. At this time, the A-image data and the B-image data have the phase difference due to the foregoing state and have a shift amount X as a deviation of the horizontal pixel position. In the correlation operation unit 400, the A-image data of each division area designated by the area designation unit 410 is shift-moved in the horizontal direction as illustrated in FIG. 6A. It is now assumed that a shift amount in the case of shifting the A-image data to the left is a minus amount and a shift amount in the case of shifting the A-image data to the right is a plus amount, and a shift-movement of the −S to S pixels is performed. At the time of each shift, the corresponding A-image data and B-image data are compared and the data obtained by adding the data of a smaller value in the horizontal direction is calculated as a correlation value of one row. If a positional relation of object images of the A-image data and the B-image data is as illustrated in FIG. 3B, as shown in FIG. 6B, when the sniff amount is equal to X, the correlation value becomes maximum. The correlation value of each row in the same division area is added every same shift amount and is calculated as a correlation value (correlation data) of every shift amount of one division area. At this time, the selector 430 selects the a side (correlation data) and the correlation data of each division area calculated by the correlation operation unit 400 is output to the RAM 106.

When the drive distance is calculated, the correlation data of each division area which is calculated by the correlation operation unit 400 and is stored into the RAM 106 is input to the drive distance calculation unit 420. In the drive distance calculation unit, a shirt amount (image shift amount) which becomes a maximum value of the correlation value in the correlation data of each division area is calculated. The calculated image shift amount of each division area is compared and a defocus amount Y is calculated from the image shift amount of the division area where the image shift amount is smallest. A drive distance of the third lens group 119 is calculated from the defocus amount Y on the basis of a predetermined calculation. At this time, the selector 430 selects the b side (drive distance information) and the drive distance information calculated by the drive distance calculation unit 420 is output to the RAM 106.

Although the value of the smallest one of the image shift amounts of the division areas is used in the present embodiment, the invention is not limited to such a construction. A method of selecting the division area such as a method of using an image analysis result of the same area or the like may be used.

Subsequently, the operation of the imaging apparatus in the present embodiment will be described with reference to the flowchart of FIG. 7. First, when a moving image photographing switch included in the operation unit 104 is depressed, the moving image photographing is started. When the moving image photographing is started, a power source of the imaging element 100, AFE 101, and TG 102 is turned on and the CPU 103 sets the moving image photographing. After it is set, the TG 102 outputs a read-out pulse to the imaging element 100 in response to a sync signal which is output from the CPU 103. The imaging element 100 starts the reading operation in a predetermined frame rate. Although the charge accumulating and reading operations of the moving image are executed by using an electronic shutter function by the slit rolling operation in the present embodiment, the invention is not limited to such a construction.

The A-image signal and B-image signal which were output from the imaging element 100 are converted into digital signals by the AFE 101 and are transferred as A-image data and B-image data to the RAM 106. After that, they are transferred to the image processing unit 108 and the A-image data and B-image data corresponding to the two PDs arranged under the same microlens are added every pixel. By this method, image data of a moving image frame is formed. After that, a correction processing, a compression, and the like are executed and the image data is displayed to the display unit 105 (live-view). If the moving image recording is selected by using a menu displayed on the display unit 105 and the operation unit 104 before the photographing, the moving images are sequentially recorded into the flash memory 110.

In step S700, the CPU 103 discriminates whether or not an AF switch included in the operation unit 104 is depressed. If it is determined that the AF switch is depressed, step S701 follows.

In step S701, the CPU 103 discriminates the set AF mode by obtaining its setting information. If the AF mode is selected as a search mode by using the menu displayed on the display unit 105 and the operation unit 104 before the photographing, step S702 follows.

Figure 8A:
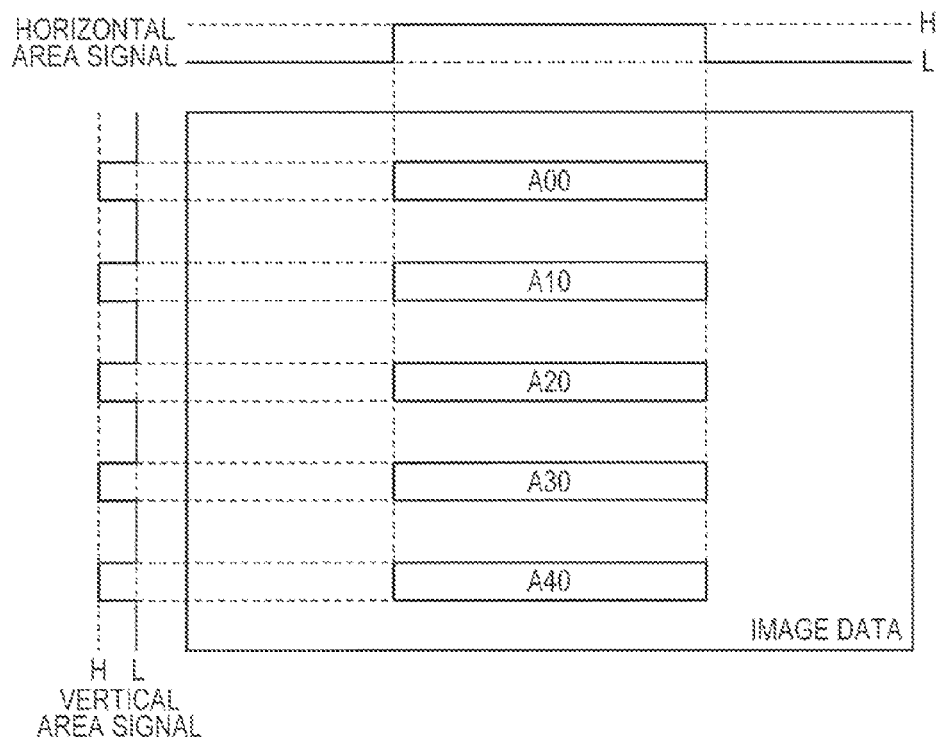
FIGS. 8A and 8B are diagrams for describing the operation of the AF operation unit of the focus detection apparatus according to the first embodiment of the invention.

In step S702, an AF area to perform the AF in the search mode is set. The CPU 103 makes a setting to the area designation unit 410 so as to divide the AF area and separately arrange the division areas in the vertical direction as illustrated in FIG. 8A. The division areas are assumed to be A00 to A40. Since the AF area is pupil-divided by using the PD 100g and PC 100h which are separated in the horizontal direction of the imaging element 100 in the present embodiment, the pupil-dividing direction is also the horizontal direction of the imaging element 100. At this time, according to the foregoing phase difference detection method mentioned above, the A-image data and the B-image data are shifted in the horizontal direction and the image shift amount is detected. Since the image is shifted to the right or left, the data of the amount to be shifted to the right or left of the area has to be held. Thus, if the area is separated in the horizontal direction, the data of the amount to be shifted to the right or left of each of the separated areas is necessary and the data holding area and a processing amount of the data increase. Therefore, the area is not separated in the horizontal direction but is separated in the vertical direction. The dividing and separating construction is not limited to that illustrated in FIG. 8A. Another dividing and arranging construction for performing the focus detection covering a wide range in the image of one frame may be used. The division areas and separating positions of the AF area may be properly preset in the CPU 103 or the like or can be also changed and set through the operation of the operation unit 104.

After that, in step S703, when the A-image data and B-image data are input to the AF operation unit 109 by the photographing, drive distance information is generated. First, the area designation unit 410 outputs a horizontal area signal and a vertical area signal at the timing shown in FIG. 8A and an area number to identify the areas A00 to A40 for the image data (A-image data, B-image data). Subsequently, the correlation operation unit 400 calculates each correlation data of A00 to A40 on the basis of the horizontal area signal, vertical area signal, and area number which are input, and stores into the RAM 106. Each correlation data is input to the drive distance calculation unit 420 and the drive distance information is output and stored into the RAM 106. It is now assumed that the area used as drive distance information is A20.

In step S704, the CPU 103 transfers the drive distance information stored in the RAM 106 to the focus drive unit 112. The focus drive unit 112 generates a drive signal of the focus actuator 114 on the basis of the drive distance information and drives the third lens group 119 so as to move backward and forward in the optical axis direction, thereby performing the focus adjustment.

Figure 8B:
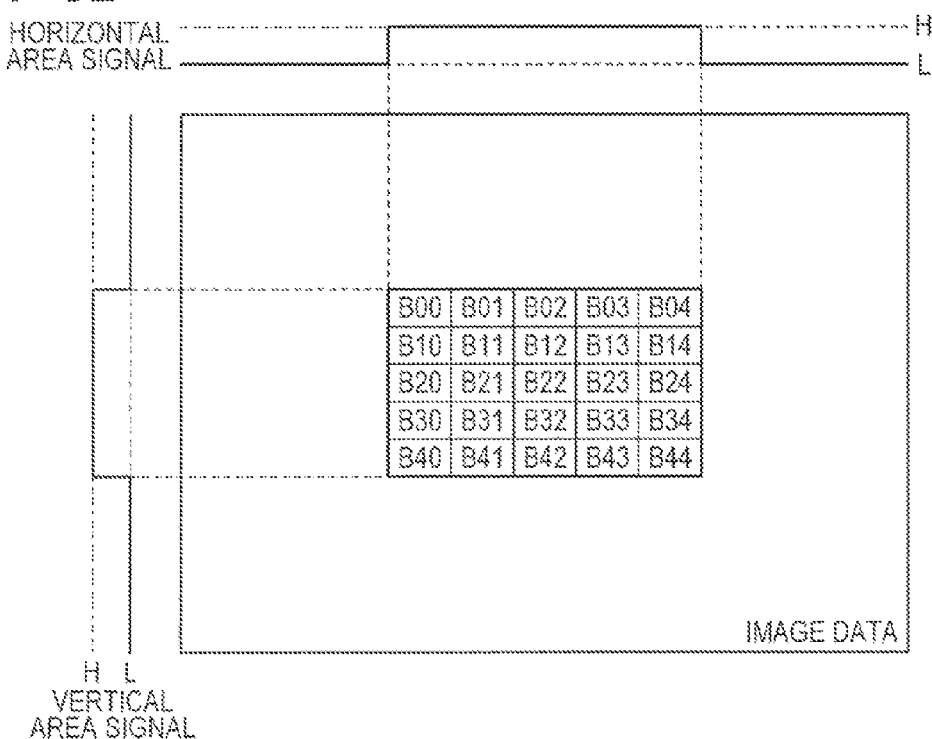

After that, in step S705, the AF area to perform the AF in the normal mode is set. As an area including A20 in FIG. 8A used in the search mode for the area designation unit 410, the CPU 103 divides a predetermined area as illustrated in FIG. 8B and the division areas are arranged so as to be adjacent to each other. The setting adapted to divide the AF area is made as mentioned above. Division areas are assumed to be B00 to B44. The setting position of the AF area in this case is set in accordance with the position of the area used as drive distance information in the search mode. The division construction may be set to a construction different from that of the setting in the case where the normal mode is selected in step S701.

Subsequently, in step S706, when the A-image data and the B-image data are input to the AF operation unit 109 by the photographing, drive distance information is generated. First, the area designation unit 410 outputs a horizontal area signal and a vertical area signal at the timing shown in FIG. 8B and an area number to identify the areas B00 to B44 for the image data (A-image data, B-image data). Thus, the correlation operation unit 400 calculates each correlation data of B00 to B44 on the basis of the horizontal area signal, vertical area signal, and area number which are input, and stores into the RAM 106. Each correlation data is input to the drive distance calculation unit 420 and the drive distance information is output and stored into the RAM 106. It is now assumed that the area used as drive distance information is B22.

Subsequently, in step S707, the CPU 103 compares the drive distance information stored in the RAM 106 with a predetermined value. When the drive distance is smaller than the predetermined value, it is determined that the object is in-focused, and step S708 follows. If it is determined that the object is not focused, the processing routine is returned to step S704 and the focus adjustment is performed on the basis of the drive distance information. After that, the focus detection operation in the normal mode in steps S705 to S707 mentioned above is repeated.

In step S708, the CPU 103 discriminates whether or not a still image photographing switch included in the operation unit 104 is depressed. If it is determined that the still image photographing switch is depressed, in step S709, the moving image photographing is interrupted and the still image photographing is performed. After that, the moving image photographing is restarted and step S710 follows. If the still image photographing switch is not depressed, step S710 follows.

In step S710, the CPU 103 discriminates whether or not the moving image photographing switch is depressed. If the moving image photographing switch is depressed, the moving image photographing is finished. If the moving image photographing switch is not depressed, the processing routine is returned to step S700 and whether or not the AF switch is depressed is discriminated.

If the normal mode is set in step S701, step S705 follows. In step S705, the foregoing normal mode is set at the position of the AF area which is preset in the CPU 103 or the like. Since subsequent processings are similar to those of the foregoing operation, their description is omitted.

By the above operation, in the AF operation, the AF area can be separated in the search mode and the locus detection can be simultaneously performed with respect to a plurality of AF detection areas covering a wider range in the image of one frame. Thus, when an area where the AF is performed is searched for in the whole display screen, it can be searched for by the smaller number of frames and a time which is required until the final in-focus is obtained can be shortened.

Embodiment 2

Subsequently, a construction of en imaging apparatus to which a focus detection apparatus according to the second embodiment of the invention is applied will be described with reference to FIGS. 9 to 14B. In the diagrams, portions similar to those in FIGS. 1 to 8B are designated by the same reference numerals.

Figure 9:
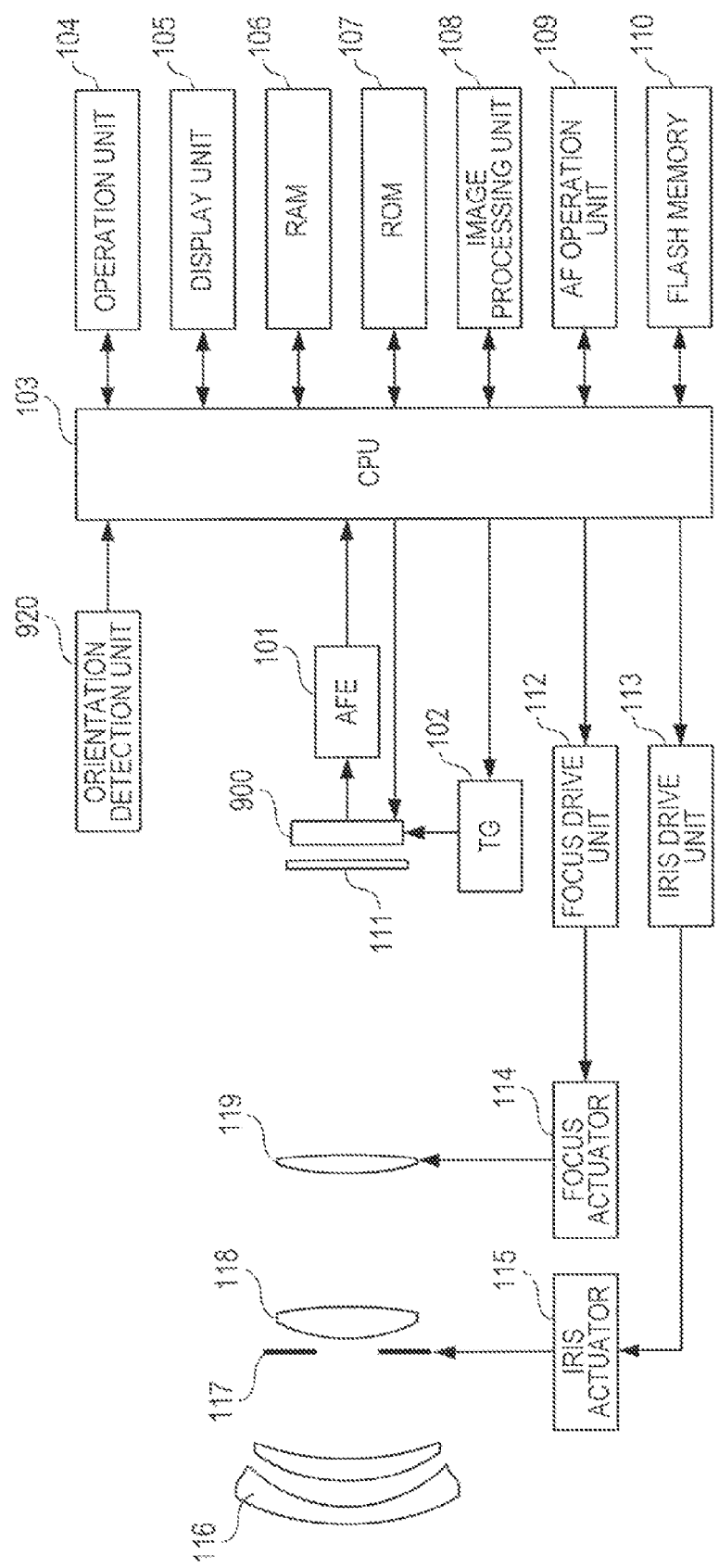
FIG. 9 is a diagram illustrating a construction of an imaging apparatus to which a focus detection apparatus according to the second embodiment of the invention is applied.

FIG. 9 is a block diagram illustrating the construction of the imaging apparatus according to the embodiment of the invention.

In the diagram, an imaging element 900 according to the present embodiment converts an optical image into an electric signal. Since component elements 101 to 119 in the second embodiment are substantially the same as the component elements 101 to 119 mentioned in the first embodiment, their description is omitted here. An orientation detection unit 920 detects a rotating direction of the imaging apparatus in a plane perpendicular to the optical axis direction.

Subsequently, the imaging element 900 will be described. A construction of the imaging element 900 is similar to the construction of the imaging element 100 mentioned in the first embodiment illustrated in FIG. 2A. A pixel structure different from that in the first embodiment will now be described.

Figure 10:
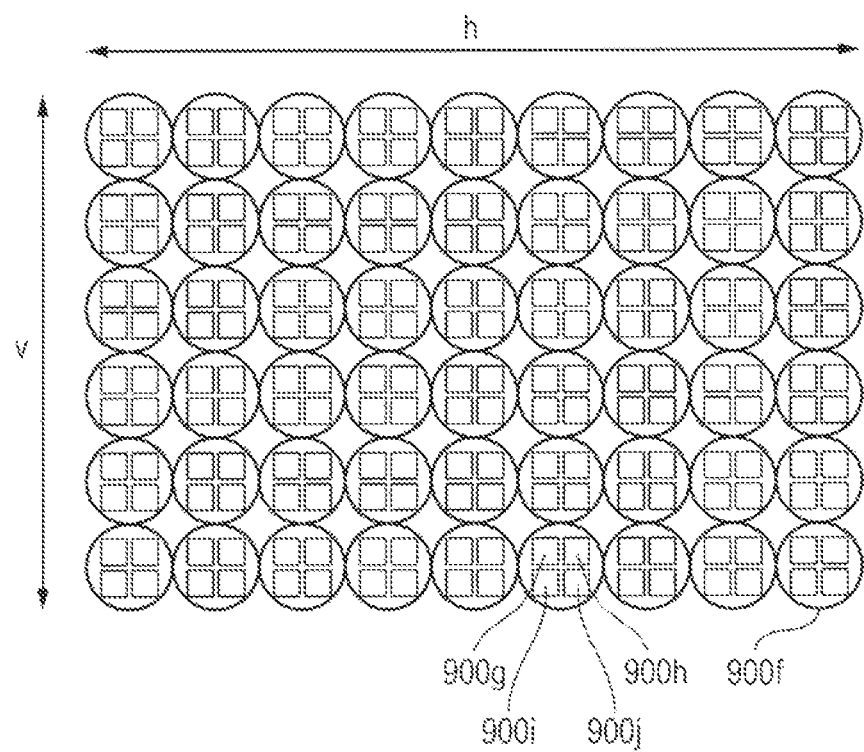
FIG. 10 is a diagram illustrating a construction of an imaging element provided for an imaging apparatus according to the second embodiment of the invention.

A pixel array of the imaging element 900 is illustrated in FIG. 10. In FIG. 10, a microlens 900*f* and photodiodes (PDs) 900*g*, 900*h*, 900*i* and 900*j* for performing the photoelectric conversion are provided. Each pixel is constructed in such a manner that one microlens 900*f* is arranged over four PDs. That is, the focus-detection pixel in the present embodiment has a plurality of photoelectric conversion units for one microlens in a manner similar to the first embodiment. Assuming that the area where the microlens 900*f* is shared is one pixel, as such a pixel, h pixels are arranged in the horizontal direction and v pixels are arranged in the vertical direction. The signals accumulated in the PDs 900*g*, 900*h*, 900*i,* and 900*j* are partially added and output to the outside by the reading operation similar to that in the first embodiment.

The images having a phase difference in accordance with the pupil-division construction described in the first embodiment in dependence on the rotating direction of the imaging element 900 in the plane perpendicular to the optical axis enter the PDs 900g, 900h, 900i, and 900j, respectively. In the present embodiment, the signals which are photoelectrically converted by the plurality of PDs are added, thereby generating signals corresponding to the A-image signal and the B-image signal. It is now assumed that the PD 900g is a photoelectric conversion unit for LU, the PD 900h is a photoelectric conversion unit for RU, the PD 900i is a photoelectric conversion unit for LD, and the PD 900j is a photoelectric conversion unit for RD. Although the four PDs are arranged for cue microlens in the present embodiment, the invention is not limited to such a construction but a further larger number of PDs may be arranged.

Figure 11A:
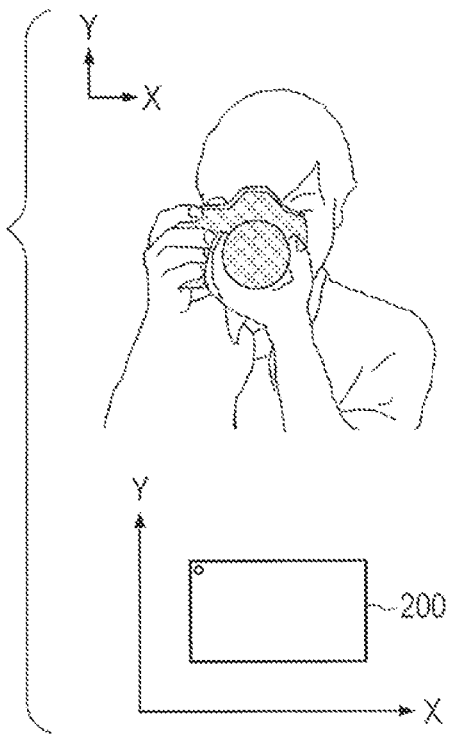
FIGS. 11A and 11B are diagrams illustrating an example of a holding direction of the imaging apparatus according to the second embodiment of the invention.
Figure 11B:
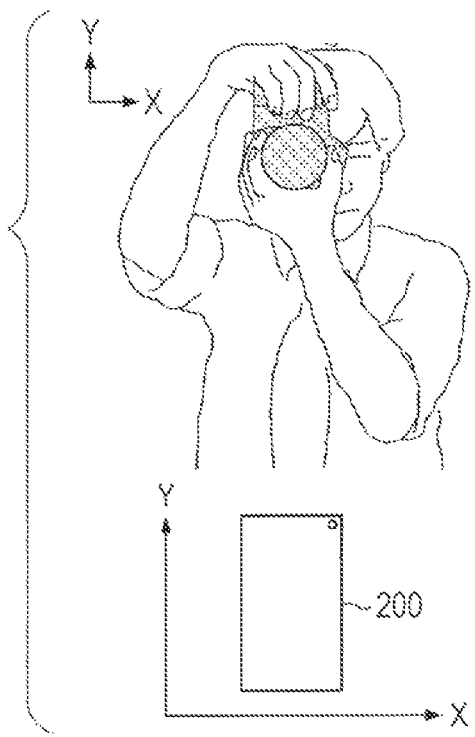
Figure 12A:
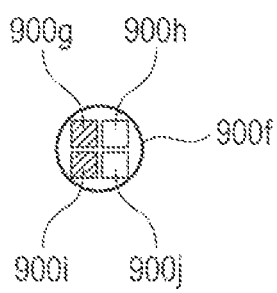
FIGS. 12A and 12B are diagrams illustrating a construction of the imaging element provided for the imaging apparatus according to the second embodiment of the invention.
Figure 12B:
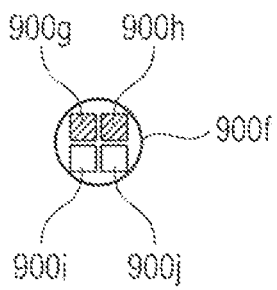

It is now assumed that in the case where the user holds the imaging apparatus in the lateral (horizontal) direction as illustrated in FIG. 11A, the long side direction of the imaging element 900 constructed by the pixel array in which h pixels are arranged is parallel with the X axis in the XY plane perpendicular to the optical axis direction. In this case, on the basis of the setting into the imaging element 900 by the CPU 103, the image signals of the PD 900g serving as a photoelectric conversion unit for LU and the PD 900i serving as a photoelectric conversion unit for LD shown by hatched portions in FIG. 12A are added and an added signal is output as an A-image signal. The image signals of the PD 900h serving as a photoelectric conversion unit for RU and the PD 900j serving as a photoelectric conversion unit for RD which are not shown by the hatched portions in FIG. 12A are added and an added signal is output as a B-image signal. On the other hand, it is now assumed that in the case where the user holds the imaging apparatus in the longitudinal (vertical) direction as illustrated in FIG. 11B, the direction of the side of the imaging element 900 constructed by the pixel array in which h pixels are arranged is parallel with the Y axis its the XY plane perpendicular to the optical axis direction. In this case, on the basis of the setting into the imaging element 900 by the CPU 103, the image signals of the PD 900g serving as a photoelectric conversion unit for LU and the PD 900h serving as a photoelectric conversion unit for RU shown by hatched portions in FIG. 12B are added and an added signal is output as an A-image signal. The image signals of the PD 900i serving as a photoelectric conversion unit for LD and the PD 900j serving as a photoelectric conversion unit for RD which are not shown by the hatched portions in FIG. 12B are added and an added signal is output as a B-image signal. The PDs whose image signals are added are changed in accordance with the orientation of the imaging element 900 and the A-image signal or B-image signal is generated as mentioned above, so that the direction of the pupil-division can be made constant (horizontal direction here) and performance of the AF to the same object can be made identical.

Although the image signals from the photoelectric conversion units are added in the imaging element 900 in the present embodiment, the invention is not limited to such a construction. It is also possible to construct in such a manner that the image signals of all of the photoelectric conversion units are output from the imaging element 900 and the image signals or the converted digital image data are added in the outside of the imaging element 900.

The A-image signal and B-image signal generated as mentioned above are used for the correlation operation by a construction similar to that in the first embodiment. Since a construction of the AF operation unit 109 is similar to that in the first embodiment, the operation similar to that in the first embodiment is executed. Therefore, its description is omitted here.

Figure 13:
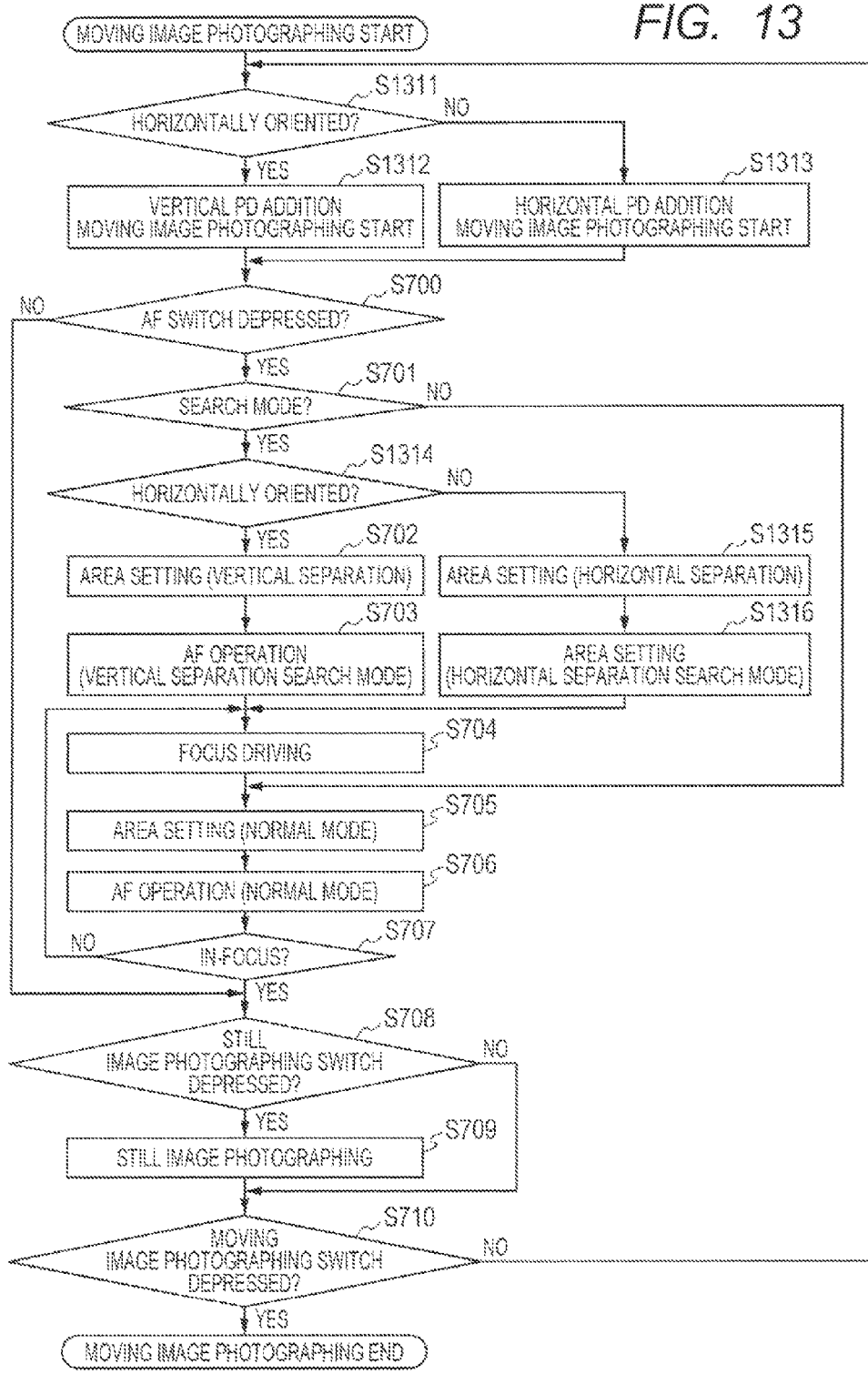
FIG. 13 is a diagram illustrating a flowchart for the operation of the imaging apparatus according to the second embodiment of the invention.

Subsequently, the operation of the imaging apparatus according to the present embodiment will be described with reference to a flowchart of FIG. 13. First, when the moving image photographing switch included in the operation unit 104 is depressed, the holding direction of the imaging apparatus is discriminated in step S1311. If the CPU 103 determines that the imaging apparatus is horizontally oriented as illustrated in FIG. 11A on the basis of information of the holding direction which is output from the orientation detection unit 920, step S1312 follows. In step S1312, a setting for adding the PD signals in the same pixel is made in accordance with the decided holding direction of the imaging apparatus. Since if is determined here that the imaging apparatus is horizontally oriented, the CPU 103 makes a setting for adding the signals of the PDs 900g and 900i shown in FIG. 12A into the imaging element 900. A signal obtained by the addition is the A-image signal. The CPU 103 also mates a setting for adding the signals of the PDs 900h and 900j. A signal obtained by the addition is the B-image signal. After the addition is set, the moving image photographing is started. When the moving image photographing is started, the power source of the imaging element 900, AFE 101, and TG 102 is turned on and the CPU 103 sets the moving image photographing. After the setting, the TG 102 outputs a read-out pulse to the imagine element 900 in response to the sync signal which is output from the CPU 103. The imaging element 900 starts the reading operation in a predetermined frame rate. Although the charge accumulating and reading operations of the moving image are executed by using the electronic shutter function by the slit rolling operation in the present embodiment, the invention is not limited to such a construction in a manner similar to the first embodiment.

The A-image signal and B-image signal which are output from the imaging element 900 are converted into digital signals by the AFE 101 and are transferred as A-image data and B-image data into line RAM 106. After that, they are transferred to the triage processing unit 108 and the A-image data and B-image data corresponding to the PDs existing under the same microlens are added every pixel, thereby forming frame data of the moving image. After that, the correction processing, compression, and the like are executed and the moving image data is displayed to the display unit 105 (live-view). In the case where the moving image recording is selected by using the menu displayed to the display unit 105 and the operation unit 104 prior to photographing, the moving image data is sequentially recorded into the flash memory 110. After that, step S700 follows.

If it is determined in step S1311 that the imaging apparatus is vertically held as illustrated in FIG. 11B, step S1313 follows. In step S1313, the addition setting of the PD signals in the same pixel is made. Since it is determined here that the imaging apparatus is vertically held, the CPU 103 makes a setting for adding the signals of the PDs 900g and 900h illustrated in FIG. 12B to the imaging element 900. A signal obtained by the addition is the A-image signal. The CPU 103 also makes a setting for adding the signals of the PDs 900i and 900j. A signal obtained by the addition is the B-image signal. After the addition setting, the moving image photographing is started. Since the operation which is executed from the moving image photographing to step S700 is similar to the operation described in step S1312, its description is omitted here.

In step S700, the CPU 103 discriminates whether or not the AF switch included in the operation unit 104 is depressed. If it is determined that the AF switch is depressed, step S701 follows.

In step S701, the CPU 103 discriminates the set AF mode. If the AF mode is selected as a search mode by using the menu displayed on the display unit 105 and the operation unit 104 before the photographing, step S1314 follows.

In step S1314, the holding direction of the imaging apparatus is discriminated. If the CPU 103 determines that the imaging apparatus is horizontally held as illustrated in FIG. 11A on the basis of the information of the holding direction which is output from the orientation detection unit 920, step S702 follows.

Since subsequent processings in steps S702 to S709 in the present embodiment are similar to those in steps S702 to S709 in lute first embodiment, their description is omitted here.

In step S710, the CPU 103 discriminates whether or not the foregoing moving image photographing switch is depressed. If the moving image photographing switch is depressed, the moving image photographing is finished. If the moving image photographing switch is not depressed, the processing routine is returned to step S1311 and the holding direction of the imaging element is discriminated.

If the CPU 103 determines in step S1314 that the imaging apparatus is vertically held as illustrated in FIG. 11B on the basis of the orientation information which is output from the orientation detection unit 920, step S1315 follows.

Figure 14A:
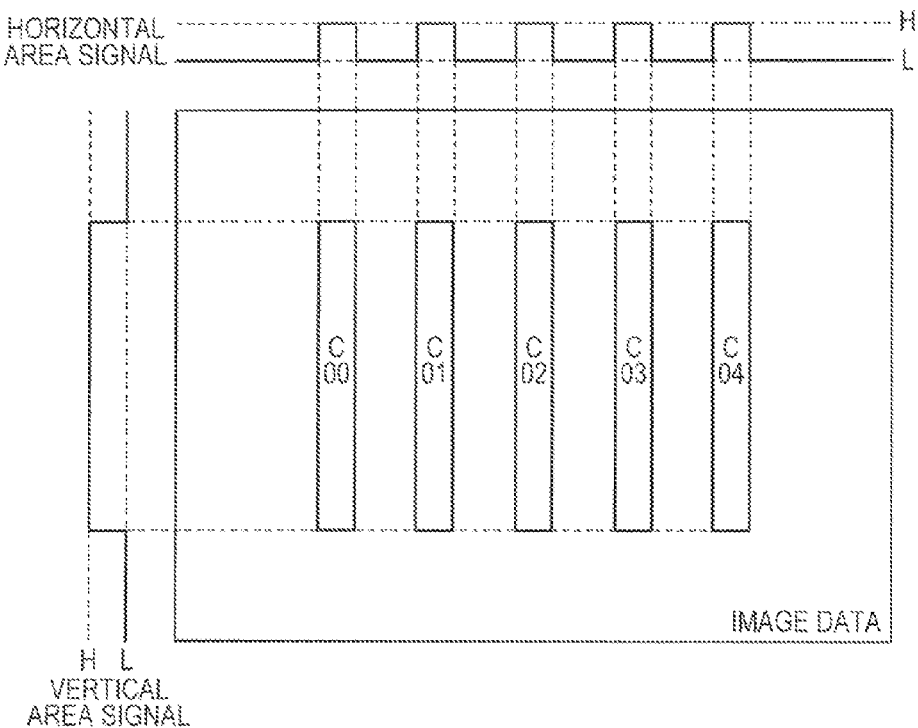
FIGS. 14A and 14B are diagrams for describing the operation of an AF operation unit of the focus detection apparatus according to the second embodiment of the invention.

In step S1315, the AF area to perform the AF in the search mode is set. The CPU 103 makes a setting for dividing the hub area and separating in the horizontal (lateral) direction of the imaging element 900 to the area designation unit 410 as illustrated in FIG. 14A. Division areas are assumed to be C00 to C04. In this instance, since the pupil-division is performed on the assumption that the signal obtained by adding the signals of the PDs 900g and 900h of the imaging element 900 is the A-image signal and the signal obtained by adding the signals of the PDs 900i and 900j of the imaging element 900 is the B-image signal, the pupil-division direction is also equal to the vertical (longitudinal) direction of the imaging element 900. In this manner, when the holding direction of the imaging element is the vertical orientation as illustrated in FIG. 11B, the correspondence relation among the long side direction and the short side direction of the pixel array area and the division and separation direction of the AF area is changed from the correspondence relation (FIGS. 8A and 8B) at the time of the horizontal orientation as illustrated in FIG. 11A. Thus, the pupil-division direction can be made constant (in this instance, the horizontal direction) and the performance of the AF to the same object can be made identical. At this time, according to the foregoing phase difference detection method, the A-image data and the B-image data are shifted in the vertical direction of the imaging element and the image shift amount is detected. Since the image is vertically shifted, data of amounts adapted to shift the image to the upper and lower portions of the area has to be held. Thus, if the area is separated in the vertical direction, data of amounts adapted to shift the image to the upper and lower portions of each of the separated areas is necessary, a data holding area and a data processing amount increase. Therefore, the AF area is not separated in the vertical direction but is separated in the horizontal direction.

After that, when the A-image data and the B-image data are input to the AF operation unit 109 by the photographing in step S1316, drive distance information is generated. First, to the image data (A-image data, B-image data), the area designation unit 410 outputs a horizontal area signal and a vertical area signal and the area number to identify the division areas C00 to C04 at timing illustrated in FIG. 14A. Subsequently, on the basis of the horizontal area signal, vertical area signal, and area number which are input, the correlation operation unit 400 calculates each correlation data of C00 to C04, and stores into the RAM 106. Each correlation data is input to the drive distance calculation unit 420 and the drive distance information is output and stored into the RAM 106. It is now assumed that the area used as drive distance information is C02.

In step S704, the CPU 103 transfers the drive distance information which is stored in the RAM 100 to tine focus drive unit 112. The focus drive unit 112 drives the focus actuator 114 on the basis of the drive distance information and moves the third lens group 119 backward and forward in the optical axis direction, thereby performing the focus adjustment.

Figure 14B:
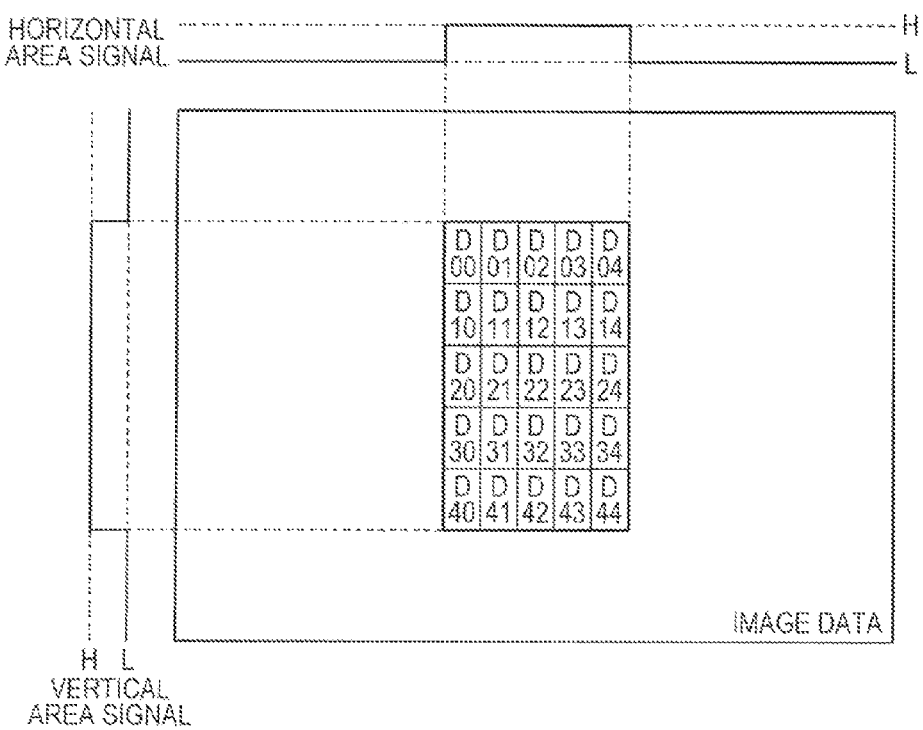

After that, in step S705, the AF area to perform the AF in the normal mode is set. The CPU 103 makes a setting for dividing the AF area as illustrated in FIG. 14B to the area designation unit 410 as an area which is used in the search mode and includes C02 in FIG. 14A. Division areas are assumed to be D00 to D44. The setting position of the AF area in this case is set in accordance with the position of the area used as drive distance information in the search mode. The division construction may be set to be different from that in the setting in the case where the normal mode is selected in step S701.

After that, when the A-image data and the B-image data are input to the AF operation unit 109 by the photographing in step S706, drive distance information is generated. First, to the image data (A-image data, B-image data), the area designation unit 410 outputs a horizontal area signal and a vertical area signal and the area number to identify the division areas D00 to D44 at timing illustrated in FIG. 14B. Subsequently, on the basis of the horizontal area signal, vertical area signal, and area number which are input, the correlation operation unit 400 calculates each correlation data of D00 to D44, and stores into the RAM 106. Each correlation data is input to the drive distance calculation unit 420 and the drive distance information is cutout and stored into the RAM 106. It is now assumed that the area used as drive distance information is D22.

Subsequently, in step S707, the CPU 103 compares the drive distance information stored in the RAM 106 with a predetermined value. When the drive distance is smaller then the predetermined value, the CPU 103 determines that the image is in-focused, and step S708 follows. If it is determined that the image is not in-focused, the processing routine is returned to step S704. The focus adjustment is made on the basis of the drive distance information. After that, the operation from steps S705 to S707 mentioned above is repeated.

The subsequent operation from steps S708 to S709 is similar to that from steps S700 to S709 mentioned in the first embodiment. The operation in step S710 is similar to that mentioned above.

By the foregoing operation, the separating direction of the AF area can be changed in accordance with the pupil-division direction in the AF operation in the search mode. Irrespective of the holding direction of the imaging apparatus, the focus detection can be simultaneously performed in the image of one frame covering a wider range. Thus, in the case of searching for the area where the AF is performed in the whole display screen, it can be searched for by the small number of frames. The time which is required until the final in-focus is obtained can be shortened.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-064240, filed on Mar. 26, 2013, which is hereby incorporated by reference herein in its entirety.

What is claimed is:

1. A focus detection apparatus comprising:
an image data obtaining unit configured to obtain image data of an optical image of an object, the image data being obtained by an imaging unit, wherein the imaging unit is configured to output parallax images as the image data, wherein the imaging unit includes a plurality of pixels arranged in an array in a first direction and a second direction different from the first direction in a pixel array area, wherein the image data are output from the plurality of pixels arranged in the pixel array area of the imaging unit on a line by line basis, wherein the line is extended in the first direction, and wherein a plurality of the lines are arranged repeatedly in the second direction;
a setting unit configured to set a focus detection area which includes a plurality of detection areas;
a mode information obtaining unit configured to obtain setting information of a focus detection mode, wherein the focus detection mode includes a first mode and a second mode, and wherein a size of a region, where the focus detection area is set, in the second direction in the second mode is larger than a size of a region, where the focus detection area is set, in the second direction in the first mode;
a generating unit configured to generate defocus information by calculating a phase difference of the parallax images in the first direction; and
a drive signal generation unit configured to generate a drive signal for a photographing optical system on the basis of the focus detection information, wherein a size of the detection area in the first direction in the second mode is larger than a size of the detection area in the first direction in the first mode,
wherein an arrangement of the detection areas in the second direction in the second mode is more discrete than an arrangement of detection areas in the second direction in the first mode, and
wherein at least one of the image data obtaining unit, the mode information obtaining unit, the setting unit, the generating unit, and the drive signal generation unit is implemented by a processor and a memory.

2. The focus detection apparatus according to claim 1, wherein the defocus information is generated by using the parallax images in the first direction.

3. The focus detection apparatus according to claim 1, wherein the second direction is vertical to the first direction.

4. The focus detection apparatus according to claim 1,
wherein the first direction is a direction which is parallel with a first side of the pixel array area of the imaging unit, and
wherein the second direction is a direction which is parallel with a second side of the pixel array area perpendicular to the first side of the pixel array area.

5. The focus detection apparatus according to claim 1, further comprising a holding information obtaining unit configured to obtain information of a holding direction of an imaging apparatus in which the imaging unit is provided therein,
wherein the setting unit changes a correspondence relation among the first direction, the second direction, and sides perpendicular to each other in the pixel array area of the imaging unit in accordance with the holding direction.

6. The focus detection apparatus according to claim 1,
wherein the image data includes first image data and second image data obtained by imaging a plurality of optical images of the object which passed through different exit pupils of the photographing optical system by the imaging unit,
wherein the generating unit arithmetically operates a correlation value between the first image data and the second image data of each detection area, and
wherein the drive signal generation unit selects one of the plurality of detection areas on the basis of the correlation value and generates the drive signal on the basis of the correlation value of the selected detection area.

7. The focus detection apparatus according to claim 1, wherein a total area of the focus detection area in the first mode is equal to a total area of the focus detection area in the second mode.

8. A focus detection method comprising:
obtaining image data of an optical image of an object, the image data being obtained by an imaging unit, wherein the imaging unit is configured to output parallax images as the image data, wherein the imaging unit includes a plurality of pixels arranged in an array in a first direction and a second direction different from the first direction in a pixel array area, wherein the image data are output from the plurality of pixels arranged in the pixel array area of the imaging unit on a line by line basis, wherein the line is extended in the first direction, and wherein a plurality of the lines are arranged repeatedly in the second direction;
setting a focus detection area which includes a plurality of detection areas;
obtaining setting information of a focus detection mode, wherein the focus detection mode includes a first mode and a second mode, and wherein a size of a region, where the focus detection area is set, in the second direction in the second mode is larger than a size of a region, where the focus detection area is set, in the second direction in the first mode;

generating defocus information by calculating a phase difference of the parallax images in the first direction; and generating a drive signal for a photographing optical system on the basis of the focus detection information, wherein a size of the detection area in the first direction in the second mode is larger than a size of the detection area in the first direction in the first mode, and wherein an arrangement of the detection areas in the second direction in the second mode is more discrete than an arrangement of detection areas in the second direction in the first mode.

9. A non-transitory computer-readable storage medium storing a program for causing a computer to control an image processing apparatus including an image data obtaining unit configured to obtain image data of an optical image of an object, the image data being obtained by an imaging unit, wherein the imaging unit is configured to output parallax images as the image data, wherein the imaging unit includes a plurality of pixels arranged in an array in a first direction and a second direction different from the first direction in a pixel array area, wherein the image data are output from the plurality of pixels arranged in the pixel array area of the imaging unit on a line by line basis, wherein the line is extended in the first direction, and wherein a plurality of the lines are arranged repeatedly in the second direction, the program causing the computer to function as:

a setting unit configured to set a focus detection area which includes a plurality of detection areas;

a mode information obtaining unit configured to obtain setting information of a focus detection mode, wherein the focus detection mode includes a first mode and a second mode, and wherein a size of a region, where the focus detection area is set, in the second direction in the second mode is larger than a size of a region, where the focus detection area is set, in the second direction in the first mode;

a generating unit configured to generate defocus information by calculating a phase difference of the parallax images in the first direction; and a drive signal generation unit configured to generate a drive signal for a photographing optical system on the basis of the focus detection information, wherein a size of the detection area in the first direction in the second mode is larger than a size of the detection area in the first direction in the first mode, and wherein an arrangement of the detection areas in the second direction in the second mode is more discrete than an arrangement of detection areas in the second direction in the first mode.

10. An imaging apparatus comprising:

an imaging unit configured to output parallax images as image data, wherein the imaging unit includes a plurality of pixels arranged in an array in a first direction and a second direction different from the first direction in a pixel array area, wherein the image data are output from the plurality of pixels arranged in the pixel array area of the imaging unit on a line by line basis, wherein the line is extended in the first direction, and wherein a plurality of the lines are arranged repeatedly in the second direction;

a mode setting unit configured to set a focus detection mode; and a focus detection apparatus configured to perform a focus detection in accordance with the focus detection mode, the focus detection apparatus including:

an image data obtaining unit configured to obtain image data of an optical image of an object, the image data being obtained by the imaging unit, wherein the imaging unit is configured to output parallax images as the image data;

a setting unit configured to set a focus detection area which includes a plurality of detection areas;

a mode information obtaining unit configured to obtain setting information of a focus detection mode, wherein the focus detection mode includes a first mode and a second mode, and wherein a size of a region, where the focus detection area is set, in the second direction in the second mode is larger than a size of a region, where the focus detection area is set, in the second direction in the first mode;

a generating unit configured to generate defocus information by calculating a phase difference of the parallax images in the first direction; and a drive signal generation unit configured to generate a drive signal for a photographing optical system on the basis of the focus detection information, wherein a size of the detection area in the first direction in the second mode is larger than a size of the detection area in the first direction in the first mode, wherein an arrangement of the detection areas in the second direction in the second mode is more discrete than an arrangement of detection areas in the second direction in the first mode, and wherein at least one of the image data obtaining unit, the mode information obtaining unit, the setting unit, the generating unit, and the drive signal generation unit is implemented by a processor and a memory, wherein the imaging apparatus further comprises a drive unit configured to drive the photographing optical system in accordance with the drive signal generated by the drive signal generation unit.

11. The imaging apparatus according to claim 10, wherein the mode setting unit sets the first mode and the second mode as a focus detection mode, and the mode information obtaining unit obtains setting information of the mode setting unit.

12. The imaging apparatus according to claim 10, further comprising:

a detection unit configured to detect a holding direction of the imaging apparatus, and a mode information obtaining unit configured to obtain information of the holding direction detected by the detection unit.

13. The imaging apparatus according to claim 10, wherein the imaging unit has a microlens array in which a plurality of microlenses are two-dimensionally arranged, wherein the imaging unit has a plurality of pixels two-dimensionally arranged in the pixel array area, wherein each pixel includes a plurality of photoelectric conversion units divided for each microlens, and wherein the plurality of photoelectric conversion units construct a first photoelectric conversion unit for receiving light, which passes through a first area of an exit pupil of the photographing optical system and is pupil-divided, and a second photoelectric conversion unit for receiving light, which passes through a second area deviated from the first area and is pupil-divided.

14. The imaging apparatus according to claim 13, further comprising an image processing unit configured to generate first image data by adding pixel signals of the plurality of photoelectric conversion units constructing the first photoelectric conversion unit and to generate second image data by adding pixel signals of the plurality of photoelectric conversion units constructing the second photoelectric conversion unit, wherein the image processing unit changes the plurality of photoelectric conversion units constructing each of the first and second photoelectric conversion units in accordance with a holding direction detected by a detection unit.

15. The imaging apparatus according to claim 10, wherein the imaging unit has a microlens array in which a plurality of microlenses are two-dimensionally arranged, wherein the imaging unit has a plurality of pixels two-dimensionally arranged in the pixel array area, and wherein the plurality of pixels including a first pixel containing a first photoelectric conversion unit for receiving only light, which passes through a first area of an exit pupil of the photographing optical system and is pupil-divided, and a second pixel containing a second photoelectric conversion unit for receiving light, which passes through a second area deviated from the first area of the exit pupil and is pupil-divided.

* * * * *